Feb. 1, 1938.  J. FRANK  2,106,889
LIGHT SCREEN FOR AUTOMOBILES
Filed Nov. 24, 1936
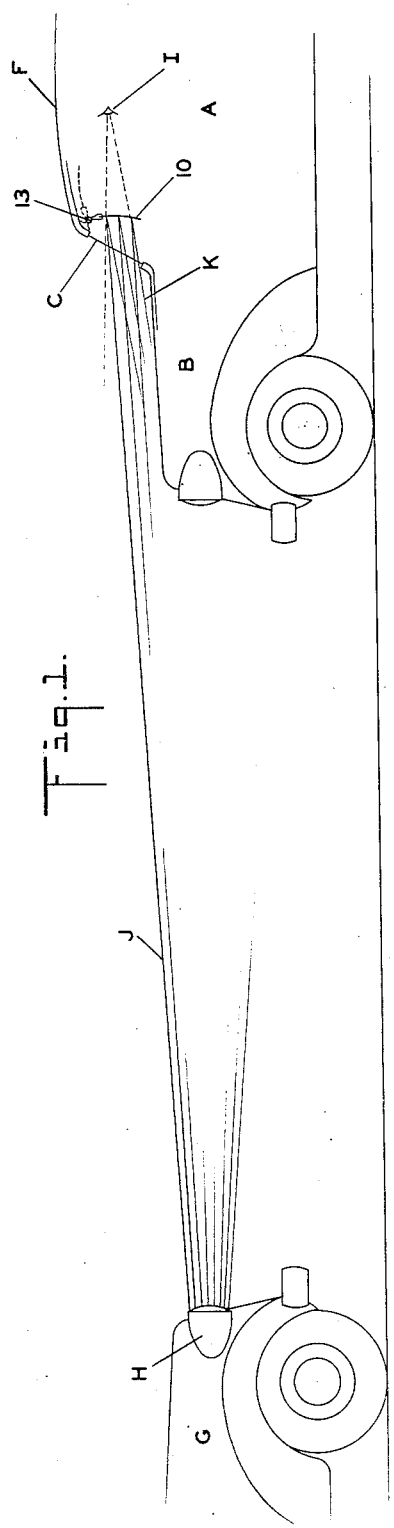
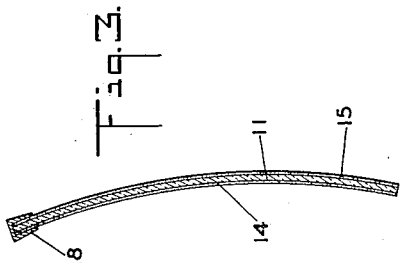
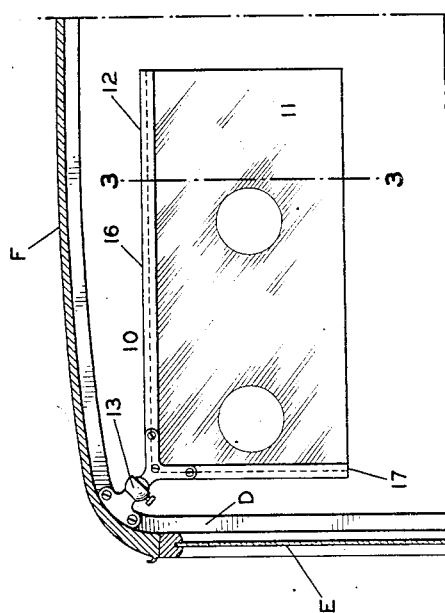
INVENTOR
JOSEPH FRANK
BY Orton and Griswold.
ATTORNEYS Patented Feb. 1, 1938

2,106,889

UNITED STATES PATENT OFFICE 2,106,889

LIGHT SCREEN FOR AUTOMOBILES

Joseph Frank, Brooklyn, N. Y.

Application November 24, 1936, Serial No. 112,458

4 Claims. (Cl. 296—97)

The invention relates to a light screen for use on an automotive vehicle to protect the eyes of the driver from the blinding effect of the headlight beams from an oncoming car, as well as from the glare from sunlight and light from other sources such as light reflected from wet pavements. The invention particularly relates to eye shields and screens of the type in which light from a beam of strong light impinging on a combined semi-transparent screen and mirror is for the most part reflected but some of which light is permitted to traverse the mirror without being broken up so that objects therebeyond are visible to the driver of the vehicle at least in faint outline. This form of mirror reflector has not proved satisfactory in use, among other reasons because the silvered glass plates of which they are formed develop a cloudiness which does not permit clearness of vision therethrough and the entire glass gives a cloudy, mirky white appearance which is particularly trying and fatiguing on the eye. These known screens possess other inherent objectionable features, for instance, the glass is easily shatterable thus presenting danger from broken glass in the event of accident or breakage due to a quick change in the temperature and being made of rigid glass the flat sheets or plates do not lend themselves readily to being formed into curved or other non-planar designs and cannot be changed in configuration by the driver to meet current variations in light conditions which he may care to make from time to time.

The primary object of the present invention is to provide a simple and relatively inexpensive form of combined light reflector and dimming light transmitter which will avoid the objections to present known similar devices; which will minimize eye strain; which will permit of a ready modification from one configuration to another while in use; and in general, to provide a structure, light in weight, of the minimum number of component parts and which can be easily mounted in adjustable position on the vehicle.

Another object of the invention when installed in the usual light screening position on an automotive vehicle is to utilize the lights from oncoming cars during night driving for a useful purpose and at the same time protect the drivers of both cars from the blinding effect of strong glare. More specifically defined, it is an objective of the present disclosure to reflect the light from the headlights of the oncoming car to illuminate the front portion of the car equipped with the device herein featured and to illuminate the ground immediately in front of this car. Accordingly, the present disclosure provides a mirror-like form of eye screen which can be easily curved, conformed and arranged to receive the light from the oncoming car and to reflect it forwardly and downwardly at a sharp angle to the horizontal thus outlining the fore portion of the vehicle so that it becomes more sharply visible to the driver of the oncoming car and at the same time the deflected rays being bent downwardly are not reflected back into the eyes of the driver of the oncoming car. The setting of such a screen to give the best results with different makes of cars and with variations in seating position, as well as variation in the eye level of different drivers, requires a certain refinement and nicety of curvature and location of the screen. The present disclosure features the forming of the screen of a flexible semi-transparent material having the necessary mirror-like capacity in association with a supporting frame having sufficient rigidity to maintain any form in which it may be bent for the time being and having sufficient pliability to permit its change from one form to another in resetting the curvature of the screen by a simple manual manipulation of the driver and without necessity of using any tools to effect the desired change.

Various other objects and advantages of the invention will be in part obvious from an inspection of the accompanying drawing and in part will be more fully set forth in the following particular description of one form of device embodying the invention, and the invention also consists in certain new and novel features of construction and combination of parts hereinafter set forth and claimed.

In the accompanying drawing:

Fig. 1 is a vertical sectional view of parts of the front part of an automotive vehicle showing a preferred embodiment of the invention installed therein and shown in relation to an oncoming car with certain light rays therefrom indicated by fine lines;

Fig. 2 is an enlarged view in elevation of the combined screen and mirror of Fig. 1 as seen by the driver and with adjacent parts of the vehicle shown in section; and Fig. 3 is a vertical sectional view through the combined screen and mirror and taken on the line 3—3 of Fig. 2.

In the drawing and referring first to the vehicle shown to the right of Fig. 1, there is disclosed a conventional showing of the front portion of an automobile including the body A, the forwardly projecting cowl B, glass wind shield C, supported in side frames, one shown at D, side window E, and a roof F. Mounted at the juncture of the roof and left side frame and slightly above eye level of the driver and to the left of his normal forward line of vision is a combined light reflector, light screen and light transmitter 11 of semi-transparent material and hereinafter sometimes referred to as a screen. It is supported by a frame 12 and which frame is mounted in position by means of a universally articulated bracket 13 for permitting a swinging of the screen to and from its several operative and in out of the way positions such as the elevated position indicated by the dotted line position in Fig. 1, all as is well known in this art.

The screen 11 is initially flat and is manufactured in large sheets, suitably cut to the desired shape and size. Preferably the sheet is cut to form the screen of sufficient horizontal length so as to shut off from both eyes of the driver the two beams of light from the oncoming car G when the oncoming car reaches the angle where its light becomes annoying to the driver facing it. For economic and other reasons the all-over dimensions of the screen are maintained as small as is possible and at the same time to obtain the objectives herein featured. It is suggested that the screen be so proportioned and located that its right hand unframed edge be located approximately in the center of the driver's line of vision so that in normal driving he will look past the screen and see clearly through the windshield and thus distinctly see objects in advance of the car, while permitting a partial blocking out of objects which come near to the car and on the left side and in which area the lights from the oncoming car become particularly annoying. The sheet 11 is a thin sheet of celluloid coated on opposite sides with a thin metallic silvery material forming an outer concaved reflector 14 and an inner convex reflector 15. It is within the scope of this disclosure to form the sheet 11 of a transparent, colored or tinted celluloid or equivalent flexible plastic material and to confine the reflecting coating to one side. Extreme care must be exercised in forming this material because of the diversity of requirements. It is required in the first place that it function as a mirror and shall reflect practically all of the light impinged thereon. At the same time it is required that sufficient light be permitted to pass through the sheet without being broken up so that strongly illuminated objects such as the oncoming car during daylight may be visible therethrough in clear outline and so that the driver can by looking through the screen during night driving see the headlights of the oncoming car as two bright spots of light but not so bright as to prevent him from looking directly at the lights without discomfort or blinding effect. This is attained by the controlling of the opaque density of the reflecting coating forming the reflectors 14 and 15, or either one of them, so as to give the proper percentage of light reflected and light transmitted with, of course, by far the major portion of the light reflected.

The frame 12 is of L-shaped form and includes a horizontal arm 16 relatively long compared with the vertically extending arm 17 along the left hand edge of the screen. This frame is preferably formed of channel metal and provided on its inner side with a channel 18 in which the edge of the celluloid sheet fits and is clamped by bending the sides of the channel towards each other with the edge of the sheet 11 therebetween. This frame is of light construction and while easily bendable by hand manipulation possesses sufficient rigidity to maintain the screen in whatever form it may be bent.

In the form suggested in Figs. 1 and 3, the depending bracket arm 17 is bent into a relatively flat curve, that is a curve of relatively large radius so as to form the sheet 11 approximately as a portion of the surface of the cylinder with the concaved side 14 facing forwardly and slightly downwardly. In operation it will be understood that the beams of light from the headlights of the oncoming car G and one of which is shown at H will impinge on the screen as indicated by the light ray lines J and be reflected from the concaved mirror 14 on to the cowl B along the reflected lines K to illuminate the fore portion of the vehicle and the ground in advance of the same. The degree of curvature and the angle at which the screen as a whole is located relative to the horizontal is controlled by the point of travel or distance from the on-coming cars at which the driver desires to cut out the strong light from the headlights of the oncoming cars. Further, the configuration and location of the screen is controlled by just what area at the front portion of his own car or what portion of the ground immediately in advance thereof towards which he desires to reflect the light. Even though the total amount of light so reflected on to the vehicle is small, it does have the effect of bringing the vehicle more pronouncedly to the visual consciousness of the driver of the oncoming car and this is particularly true in those cases where the oncoming car had its headlights active and the car equipped with the device herein featured did not have any lights in use.

It is also suggested that the screen while in the curved position illustrated may be swung bodily and slightly forwardly from the full line position of Fig. 1 and thus into an upwardly directed angular position so that the light from the oncoming car is reflected upwardly. This is a suggested position of the screen in those situations where it is undesirable to throw the light downwardly on to a wet pavement. It is appreciated that curving the screen in no way interferes with the light passing through the screen to the eye of the driver I as indicated by the light dotted lines in Fig. 1.

It is a feature of this disclosure that as the driver looks through the screen he can see objects in advance of the vehicle more or less sharply outlined depending upon their degree of illumination but at all times as if in a clear blue light. It has been found that this character of light is quite pleasing and does not develop eye strain or eye fatigue on the part of the driver even though used for long periods of time. This is believed to be due to the fact that the silvery material with which the celluloid sheet is faced is extremely thin and gives a blue tinge to the light transmitted. While this pale blue transmitted light is quite noticeable where the source of light is white in color, the transmitted blue light is not of sufficient intensity to neutralize other colors which may be present. For instance, red, green and yellow lights are distinctly transmitted as such, and, of course, blue light is transmitted in full and perhaps even exaggerated value. This means, of course, that signal and traffic lights of the usual red, green, yellow and blue colors are easily discernible as such through the screen as seen by the eyes of the driver, one of which is indicated at I.

While the disclosure is not limited to any particular kind of reflective celluloid to form the sheet II, it has been found that sheet material made in accordance with the disclosure in United States Patent No. 1,941,438 issued December 26, 1933 to Karl Kiefer and with proper regard for the thickness of the silver layer as herein featured has proved entirely satisfactory.

While there have been described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. In a device of the class described, the combination with a vehicle of means for illuminating the fore part of the vehicle, said means comprising a non-breakable combined light screen and reflector comprising a rectangular sheet of material located on the vehicle in advance of the eyes of the driver and having a form substantially that of part of a cylindrical surface with the axis horizontally disposed, with the lower edge inset towards the driver from a vertical plane containing the upper edge, with the concaved side facing outwardly away from the driver, and thus slightly downwardly, said material being partly transparent to permit a relatively slight amount of the light beams from an oncoming automobile to pass through the screen and thus cause the headlights from the oncoming automobile to be visible to the driver of the vehicle as two spots of light seen through the screen and said material being highly reflective on its advanced concaved side to reflect the major portion of such oncoming light beams downwardly towards the forward part of the vehicle and incidentally towards the road immediately in advance of the vehicle.

2. A non-breakable and easily distortable light screen for use on vehicles to protect the driver from the glare of a light beam directed towards him while permitting him to distinguish between red, green, yellow and blue signal lights visible through the screen, comprising a sheet of flexible material composed of a thin sheet of colored transparent plastic material coated on one side with a thin layer of silver, with the reflective layer sufficiently thin to permit a small portion of the light from a light beam impinging thereon to pass through the screen without any material loss in color values while reflecting the major portion of any such impinging light and sufficiently continuous to maintain its continuity even though the sheet be repeatedly flexed and a supporting frame for the flexible sheet engaging the same at least along one edge, said frame having sufficient rigidity to maintain whatever may be the form into which it is bent for the time being and being sufficiently bendable so as to permit it to be bent by hand manipulation out of one shape into another to give to the flexible sheet supported thereby a desired form.

3. A non-breakable and non-glare eye protecting device comprising a normally flat, thin, flexible sheet of transparent material coated with a thin layer of silver-like reflective material, said layer having sufficient opaque density to reflect practically all of the light from a light beam impinging thereon and sufficiently thin to transmit therethrough sufficient light to cause strongly illuminated objects on one side to be visible on the other side and having capacity to cause the light therethrough to be a clear blue and acting to transmit red, green and yellow light as such, and said device having sufficient flexibility to permit its distortion from its normal flat form into curved forms to minimize areas of glare.

4. A combined light reflector, screen and transmitter, comprising a sheet of flexible transparent celluloid coated on one side with a thin coating of silvering material capable of reflecting a large percentage of light impinging on the same; said coating being sufficiently thin to transmit therethrough a relatively small percentage of impinging strong white light as a clear blue color and acting to transmit red, green and yellow light as such, and said coating being continuous and capable of maintaining its continuity and light reflecting and transmitting capacities even though the sheet be repeatedly flexed in changing its form during use.

JOSEPH FRANK.